United States Patent
Takeda et al.

(10) Patent No.: US 10,165,600 B2
(45) Date of Patent: Dec. 25, 2018

(54) USER TERMINAL, RADIO COMMUNICATION SYSTEM AND RADIO COMMUNICATION METHOD FOR IMPROVED POWER ALLOCATION TO PHYSICAL RANDOM ACCESS CHANNELS IN DUAL CONNECTIVITY

(71) Applicant: NTT DOCOMO, INC., Tokyo (JP)

(72) Inventors: Kazuki Takeda, Tokyo (JP); Kunihiko Teshima, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/325,619

(22) PCT Filed: Jul. 10, 2015

(86) PCT No.: PCT/JP2015/069871
§ 371 (c)(1),
(2) Date: Jan. 11, 2017

(87) PCT Pub. No.: WO2016/006681
PCT Pub. Date: Jan. 14, 2016

(65) Prior Publication Data
US 2017/0164410 A1    Jun. 8, 2017

(30) Foreign Application Priority Data
Jul. 11, 2014   (JP) ................. 2014-143221

(51) Int. Cl.
*H04W 74/08* (2009.01)
*H04W 28/16* (2009.01)
(Continued)

(52) U.S. Cl.
CPC ....... *H04W 74/0833* (2013.01); *H04W 28/16* (2013.01); *H04W 52/34* (2013.01);
(Continued)

(58) Field of Classification Search
CPC . H04W 74/0833; H04W 28/16; H04W 52/34; H04W 72/0413; H04W 72/0473
See application file for complete search history.

(56) References Cited

U.S. PATENT DOCUMENTS

2013/0058315 A1    3/2013   Feuersanger et al.
2013/0250925 A1*   9/2013   Lohr ................. H04W 72/0446
                                                           370/336
(Continued)

OTHER PUBLICATIONS

3GPP TSG RAN WG1 Meeting #77 R1-142392 Seoul, Korea, Seoul, Korea, May 19-23, 2014 Source: Ericsson Title: Further Discussion on UL Power Control in Dual Connectivity.*
(Continued)

*Primary Examiner* — Chi H Pham
*Assistant Examiner* — Weibin Huang
(74) *Attorney, Agent, or Firm* — Osha Liang LLP

(57) ABSTRACT

The present invention is designed to adequately allocate power to PRACHs in dual connectivity. A user terminal communicates by using a first cell group (CG) and a second CG, and has a power control section that controls UL transmission power for the first CG and the second CG, and a transmission section that transmits at least a physical random access channel (PRACH), and, when the transmission section retransmits the PRACH in a primary cell of the first CG, the power control section applies control so that power is preferentially allocated to the retransmission of the PRACH over transmission in the second CG.

11 Claims, 12 Drawing Sheets

(51) Int. Cl.
  *H04W 52/34* (2009.01)
  *H04W 72/04* (2009.01)
  *H04W 52/50* (2009.01)

(52) U.S. Cl.
  CPC ........... *H04W 52/50* (2013.01); *H04W 72/04* (2013.01); *H04W 72/0413* (2013.01); *H04W 72/0473* (2013.01); *H04W 74/08* (2013.01)

(56) References Cited

U.S. PATENT DOCUMENTS

| | | | | |
|---|---|---|---|---|
| 2013/0258958 A1* | 10/2013 | Dinan | ............... | H04W 56/0045 370/329 |
| 2014/0247796 A1* | 9/2014 | Ouchi | ................ | H04L 5/0053 370/329 |
| 2015/0215944 A1* | 7/2015 | Kim | ................ | H04L 5/001 370/329 |
| 2016/0302235 A1* | 10/2016 | Hwang | ................ | H04W 74/08 |
| 2017/0164408 A1* | 6/2017 | Takeda | ................ | H04W 28/16 |
| 2017/0171825 A1* | 6/2017 | Takeda | ................ | H04W 52/38 |
| 2017/0303212 A1* | 10/2017 | Takeda | ................ | H04W 16/32 |

OTHER PUBLICATIONS

Extended European Search Report issued in the counterpart European Patent Application No. 15819429.0, dated Dec. 11, 2017 (9 pages).
Office Action dated Sep. 15, 2015, in corresponding Japanese Patent Application No. 2014-143221 (5 pages).
International Search Report issued in PCT/JP2015/069871 dated Sep. 29, 2015 (1 page).
Written Opinion of the International Searching Authority issued in PCT/JP2015/069871 dated Sep. 29, 2015 (3 pages).
3GPP TSG-RAN WG1 Meeting #77; R1-142264; NTT DOCOMO; "Power-control mechanisms for dual connectivity"; Seoul, Korea; May 19-23, 2014 (8 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Office Action issued in corresponding European Application No. 15819429.0, dated Sep. 7, 2018 (5 pages).

* cited by examiner

PRACH RETRANSMISSION WITH POWER-RAMPING

PRACH RETRANSMISSION WITH POWER-RAMPING

PRACH RETRANSMISSION BY POWER-RAMPING

PRACH RETRANSMISSION WITH POWER-RAMPING

USER TERMINAL, RADIO COMMUNICATION SYSTEM AND RADIO COMMUNICATION METHOD FOR IMPROVED POWER ALLOCATION TO PHYSICAL RANDOM ACCESS CHANNELS IN DUAL CONNECTIVITY

TECHNICAL FIELD

The present invention relates to a user terminal, a radio communication system and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE—referred to as, for example, "LTE-advanced" or "LTE enhancement"—have been under study for the purpose of achieving further broadbandization and increased speed beyond LTE, and the specifications thereof have been drafted as LTE Rel. 10/11.

Also, the system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When the radio base stations to form a plurality of cells are substantially the same, the above-described carrier aggregation is applicable. On the other hand, when cells are formed by completely different radio base stations, dual connectivity (DC) may be employed.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In dual connectivity, no rule is set forth as to how to allocate power to the PRACH, which is transmitted in random access.

The present invention has been made in view of the above, and it is therefore an object of the present invention to provide a user terminal, a radio communication system and a radio communication method that make it possible to allocate power to the PRACH adequately in dual connectivity.

Solution to Problem

A user terminal according to the present invention communicates by using a first cell group (CG) and a second CG, and has a power control section that controls UL transmission power for the first CG and the second CG, and a transmission section that transmits at least a physical random access channel (PRACH), and, when the transmission section retransmits the PRACH in a primary cell of the first CG, the power control section applies control so that power is preferentially allocated to the retransmission of the PRACH over transmission in the second CG.

Advantageous Effects of Invention

According to the present invention, power can be adequately allocated to the PRACH in dual connectivity.

DESCRIPTION OF EMBODIMENTS

Now, an embodiment of the present invention will be described in detail below with reference to the accompanying drawings. In LTE systems, random access is made by transmitting a physical random access channel (PRACH) on the uplink when establishing the initial connection, when establishing synchronization, when resuming communication, and so on. Random access can be classified into two types—namely, contention-based random access and non-contention-based random access.

In contention-based random access, user terminals transmit preambles, which are selected randomly from a plurality of random access preambles (contention preambles) prepared within a cell, by using PRACHs. In this case, there is a possibility that the same random access preamble is used between the user terminals and creates contention.

In non-contention-based random access, user terminals transmit UE-specific random access preambles (dedicated preambles), which are allocated by the network in advance, by using PRACHs. In this case, contention is not created because different random access preambles are allocated between the user terminals.

Contention-based random access is used when establishing the initial connection, when starting or resuming uplink communication, and so on. Non-contention-based random access is used when conducting a handover, when starting or resuming downlink communication, and so on.

Figure 1:
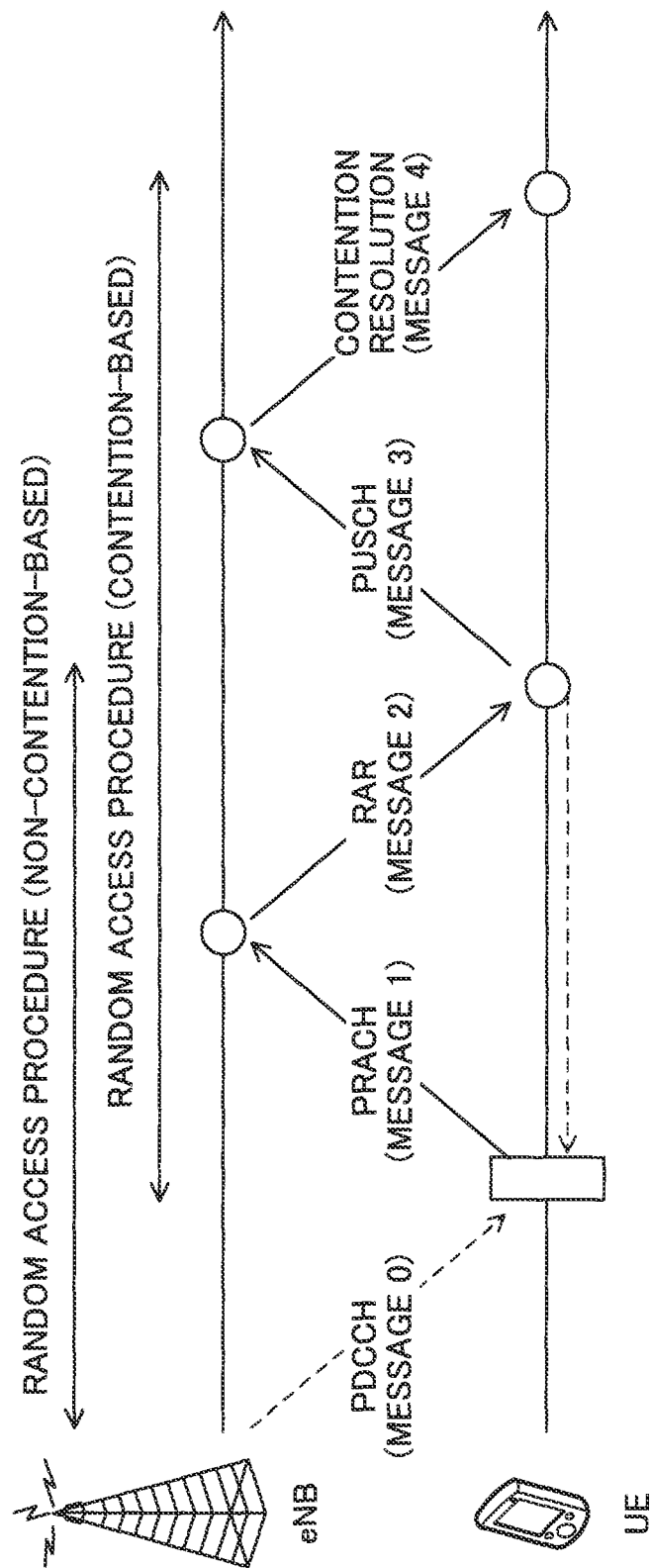
FIG. 1 is a diagram to show an overview of random access.

FIG. 1 shows an overview of random access. Contention-based random access is comprised of step 1 to step 4, and non-contention-based random access is comprised of step 0 to step 2.

In contention-based random access, first, a user terminal UE transmits a random access preamble (PRACH) by using the PRACH resource that is configured in the residing cell (message 1). The radio base station eNB, upon detecting the random access preamble, transmits a random access response (RAR), which is information in response to that (message 2). After having transmitted the random access preamble, the user terminal UE tries to receive the random access response (message 2) during a predetermined period. When the user terminal UE fails to receive message 2, the user terminal UE raises the transmission power of the PRACH and transmits message 1 again.

The user terminal UE, when receiving the random access response, transmits a data signal (message 3) by using the physical uplink shared channel (PUSCH) that is specified by an uplink scheduling grant that is included in the random access response. The radio base station eNB, upon receiving the scheduled message, transmits a contention resolution message to the user terminal UE (message 4). The user terminal UE identifies the radio base station eNB by establishing synchronization using messages 1 to 4, and thereupon finishes the contention-based random access procedure and establishes a connection.

In the event of non-contention-based random access, first, a radio base station eNB transmits a physical downlink control channel (PDCCH) to command a user terminal UE to transmit a PRACH (message 0). The user terminal UE transmits a random access preamble (PRACH) at the timing specified by the PDCCH (message 1). The radio base station eNB, upon detecting the random access preamble, transmits a random access response (RAR), which is information in response to that (message 2). The user terminal finishes the non-contention-based random access procedure upon receipt of message 2. Note that, as in contention-based random access, when the user terminal fails to receive message 2, the user terminal raises the transmission power of the PRACH and transmits message 1 again.

In LTE-A systems, a HetNet (Heterogeneous Network), in which small cells, each having a local coverage area of a radius of approximately several tens of meters, are formed within a macro cell having a wide coverage area of a radius of approximately several kilometers, is under study. Carrier aggregation and dual connectivity are applicable to HetNet structures.

Figure 2A:
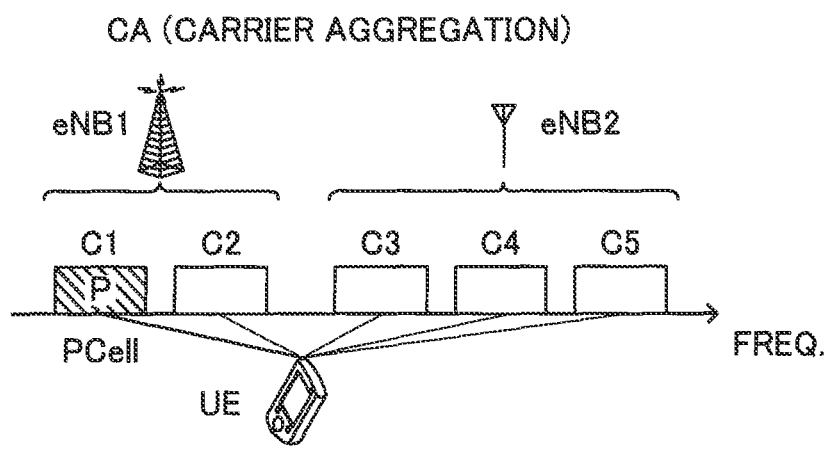
FIG. 2 provide diagrams to show communication between radio base stations and a user terminal in carrier aggregation and dual connectivity.

FIG. 2A shows communication between radio base stations and a user terminal that are engaged in carrier aggregation. In the example shown in FIG. 2A, radio base station eNB1 is a radio base station to form a macro cell (hereinafter referred to as the "macro base station"), and radio base station eNB2 is a radio base station to form a small cell (hereinafter referred to as the "small base station"). For example, the small base station may be structured like an RRH (Remote Radio Head) that connects with the macro base station.

When carrier aggregation is employed, one scheduler (for example, the scheduler provided in macro base station eNB1) controls the scheduling of multiple cells. In the structure in which the scheduler provided in macro base station eNB1 controls the scheduling of multiple cells, each radio base station may be connected by using, for example, an ideal backhaul that provides a high speed channel, such as optical fiber.

Figure 2B:
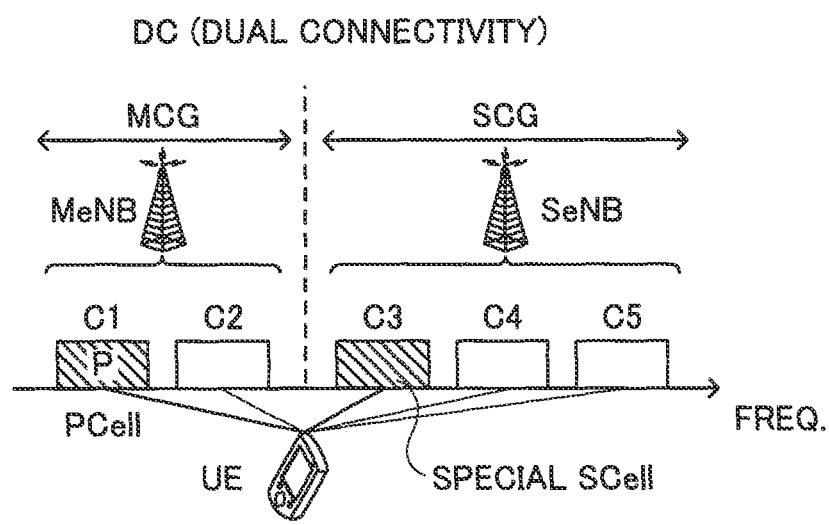

FIG. 2B shows communication between radio base stations and a user terminal that are engaged in dual connectivity. When dual connectivity is employed, a plurality of schedulers are provided separately, and these multiple schedulers (for example, the scheduler provided in the radio base station MeNB and the scheduler provided in the radio base station SeNB) each control the scheduling of one or more cells they have control over. In the structure in which the scheduler provided in the radio base station MeNB and the scheduler provided in the radio base station SeNB control the scheduling of one or more cells they each have control over, each radio base station may be connected by using, for example, a non-ideal backhaul that produces substantial delays, such as the X2 interface.

Referring to FIG. 2B, in dual connectivity, each radio base station configures a cell group (CG) that is comprised of one cell or a plurality of cells. Each cell group is comprised of one or more cells formed by the same radio base station, or one or more cells formed by the same transmission point, which may be a transmitting antenna apparatus, a transmission station and so on.

The cell group that includes the PCell will be hereinafter referred to as the "master cell group" (master cell group), and the cell group that is not the master cell group will be hereinafter referred to as the "secondary cell group" (secondary cell group). The total number of cells to constitute the master cell group and the secondary cell group is configured to be equal to or less than a predetermined value (for example, five cells).

The radio base station in which the master cell group is configured will be hereinafter referred to as the "master base station" (MeNB: Master eNB), and the radio base station in which the secondary cell group is configured will be hereinafter referred to as the "secondary base station" (SeNB: Secondary eNB).

Dual connectivity does not presume tight cooperation between radio base stations that is equivalent to that used in carrier aggregation. Consequently, the user terminal executes downlink L1/L2 control (PDCCH/EPDCCH) and uplink L1/L2 control (UCI (Uplink Control Information) feedback through the PUCCH/PUSCH) independently, on a per cell group basis. Consequently, the secondary base station, too, needs a special SCell that has equivalent functions to those of the PCell (for example, the common search space, the PUCCH and so on). A special SCell having equivalent functions to those of the PCell will be hereinafter also referred to as a "PSCell."

Figure 3:
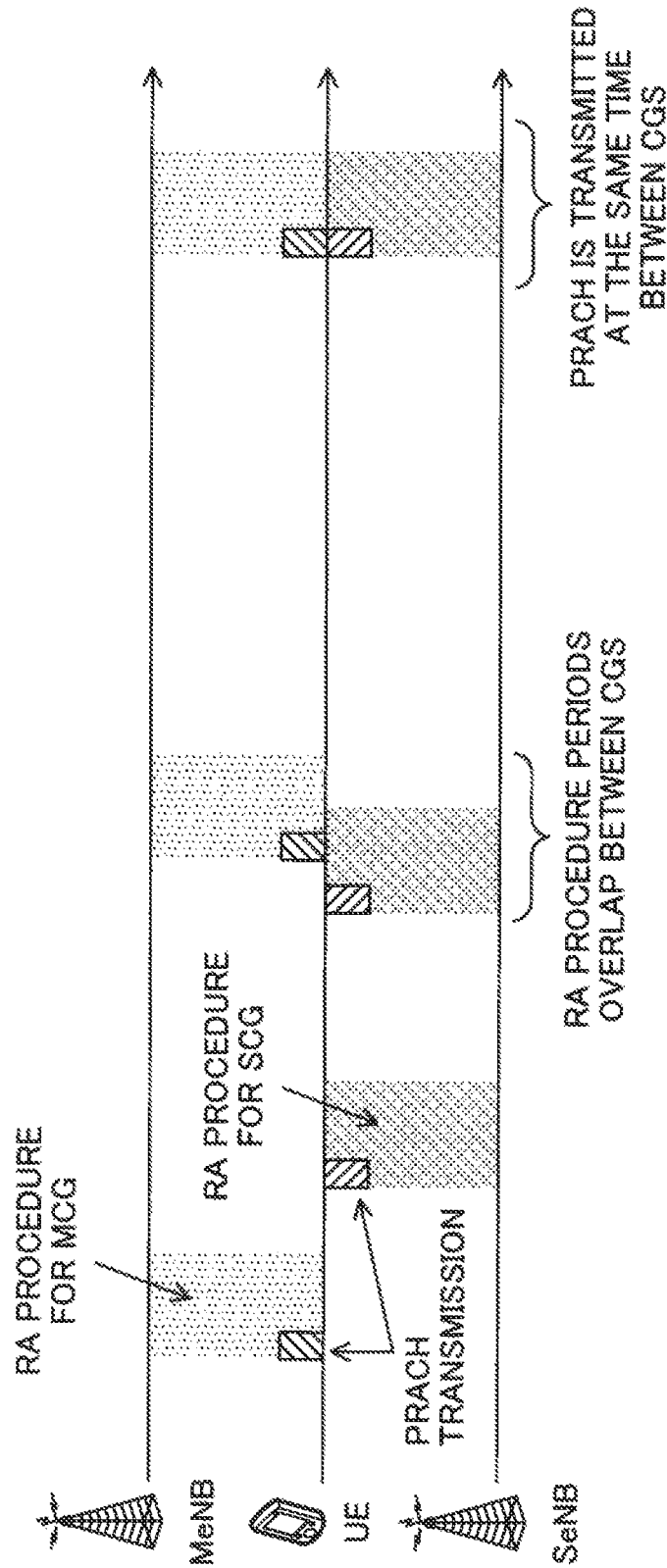
FIG. 3 is a diagram to explain random access in dual connectivity.

Dual connectivity supports random access in both the master cell group and the secondary cell group. As shown in FIG. 3, random access procedure periods are provided in both the master cell group and the secondary cell group. The user terminal UE transmits PRACHs in these periods.

In the master cell group, the PCell supports both contention-based random access and non-contention-based random access, and SCells of a sTAG (secondary Timing Advance Group) support non-contention-based random access alone. In the secondary cell group, the PSCell supports both contention-based random access and non-contention-based random access, and SCells of an sTAG support non-contention-based random access alone.

Random access can be carried out in parallel in the maser cell group and in the secondary cell group, as long as the power-limited state is not assumed. Here, the power-limited state refers to the state in which, at a timing the user terminal attempts transmission, the maximum transmission power is already reached from the perspective of at least one of the serving cell, the TAG, the cell group and this UE. For example, as shown in FIG. 3, cell groups may have overlapping random access procedure periods. Also, as shown in FIG. 3, cell groups may transmit PRACHs simultaneously.

In dual connectivity, the master base station MeNB and the secondary base station SeNB each control the scheduling independently, and therefore transmission power control to adjust transmission power dynamically within a range in which the total of the user terminal's transmission power for the master base station MeNB and the secondary base station SeNB does not exceed the maximum possible transmission power, is difficult. When the total of transmission power that is needed exceeds the user terminal's maximum possible transmission power, the user terminal performs the process of scaling down the power (power scaling) or dropping part or all of the channels or the signals (dropping) until the total transmission power to be needed assumes a value not exceeding the maximum possible transmission power.

Since, in dual connectivity, neither the master base station MeNB nor the secondary base station SeNB is able to know what power control the counterpart radio base station (the secondary base station SeNB for the master base station MeNB and the master base station MeNB for the secondary base station SeNB) is using, there is a fear that the timings and frequency these power scaling and/or dropping may be applied cannot be predicted. When power scaling and/or dropping are applied in a way that is unpredictable to the master base station MeNB and the secondary base station SeNB, uplink communication can no longer be executed properly, which then raises a fear of a significant deterioration of the quality of communication, throughput and so on.

So, dual connectivity introduces the concept of "guaranteed transmission power" (minimum guaranteed power) per cell group, at least to PUCCH/PUSCH transmission. Assume that the guaranteed transmission power for the master cell group (MCG) is $P_{MeNB}$ and the guaranteed transmission power for the secondary cell group (SCG) is $P_{SeNB}$. The master base station MeNB and the secondary base station SeNB report one or both of the guaranteed transmission power $P_{MeNB}$ and $P_{SeNB}$ to the user terminal through higher layer signaling (for example, RRC signaling). When there is no signaling or command in particular, the user terminal has only to understand that the guaranteed transmission power is: $P_{MeNB}=0$ and/or $P_{SeNB}=0$.

When a transmission request arrives from the master base station MeNB—that is, when PUCCH/PUSCH transmission is triggered by an uplink grant or by RRC signaling—the user terminal calculates the transmission power for the master cell group (MCG), and, if the power that is needed (requested power) is equal to or lower than the guaranteed transmission power $P_{MeNB}$, determines that this requested power is the transmission power of the master cell group (MCG).

When a transmission request arrives from the secondary base station SeNB—that is, when PUCCH/PUSCH transmission is triggered by an uplink grant or by RRC signaling—the user terminal calculates the transmission power for the secondary cell group (SCG), and, if the transmission power that is needed (requested power) is equal to or lower than the guaranteed transmission power $P_{SeNB}$, determines that this requested power is the transmission power of the secondary cell group (SCG).

When the requested power for a radio base station xeNB (either the master base station MeNB or the secondary base station SeNB) exceeds guaranteed transmission power $P_{xeNB}$ (either the guaranteed transmission power $P_{MeNB}$ or $P_{SeNB}$), the user terminal might control the transmission power to be equal to or lower than the guaranteed transmission power $P_{xeNB}$, depending on conditions. To be more specific, when the total of the requested power for the master cell group and the secondary cell group shows a threat of exceeding the user terminal's maximum possible transmission power $P_{CMAX}$, the user terminal applies power scaling and/or drops part of the channels or signals, with respect to the cell group where the requested power exceeds the guaranteed transmission power $P_{xeNB}$. If, as a result of this, the transmission power equals or falls below the guaranteed transmission power $P_{xeNB}$, the user terminal no longer applies power scaling and/or dropping to channels or signals.

That is, at least the guaranteed transmission power $P_{MeNB}$ or $P_{SeNB}$ is guaranteed for the maximum transmission power of the PUCCH/PUSCH in dual connectivity. However, depending on the allocation of other cell groups and the implementation of the user terminal, cases might occur where the guaranteed transmission power $P_{MeNB}$ or $P_{SeNB}$ is not guaranteed for the maximum transmission power of the PUCCH/PUSCH.

Figure 4A:
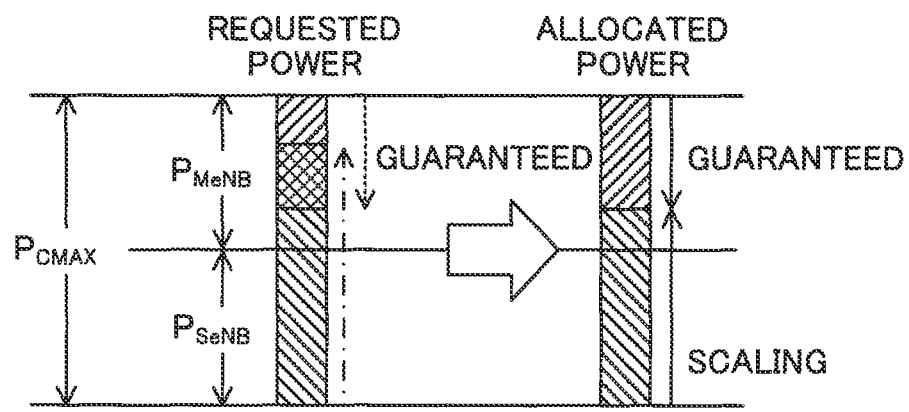
FIG. 4 provide diagrams to explain transmission power control in dual connectivity.

In the example shown in FIG. 4A, the master base station MeNB requests power that is equal to or lower than the guaranteed transmission power $P_{MeNB}$, and the secondary base station SeNB requests power beyond the guaranteed transmission power $P_{SeNB}$. The user terminal checks whether or not the total sum of the transmission power per CC exceeds the guaranteed transmission power $P_{MeNB}$ and $P_{SeNB}$ in the master cell group and in the secondary cell group, and whether or not the total sum of the transmission power of all CCs in both cell groups exceeds the maximum possible transmission power $P_{CMAX}$.

In the example shown in FIG. 4A, the total sum of the transmission power of all CCs in both cell groups exceeds the maximum possible transmission power $P_{CMAX}$, so that the user terminal applies power scaling or dropping. While the total sum of the transmission power of each CC in the master cell group does not exceed the guaranteed transmission power $P_{MeNB}$, the total sum of the transmission power of each CC in the secondary cell group exceeds the guaranteed transmission power $P_{SeNB}$, so that the user terminal allocates the requested power to the master cell group as transmission power, and allocates the rest of the power (the extra power that is left after the master cell group's transmission power is subtracted from the maximum possible transmission power $P_{CMAX}$) to the secondary cell group. The user terminal sees this remaining power as the maximum possible transmission power for the secondary cell group, and applies power scaling or dropping to the secondary cell group.

Figure 4B:
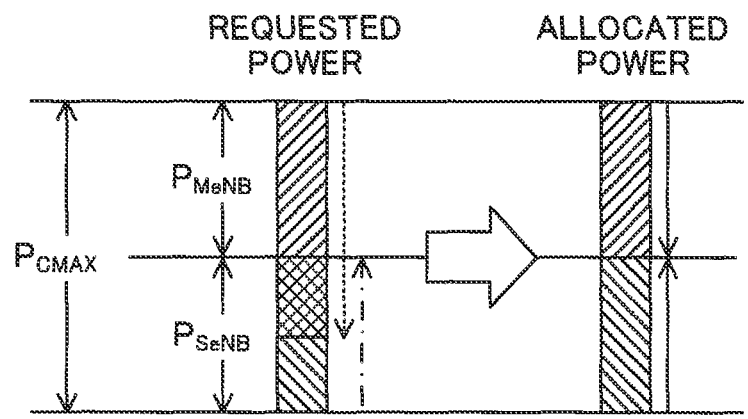

In the example shown in FIG. 4B, power to exceed the guaranteed transmission power $P_{MeNB}$ is requested from the master base station MeNB, and power that is equal to lower than the guaranteed transmission power $P_{SeNB}$ is requested from the secondary base station SeNB. The total sum of the transmission power of all CCs in both cell groups exceeds the maximum possible transmission power $P_{CMAX}$, so that the user terminal applies power scaling or dropping.

In the example shown in FIG. 4B, while the total sum of the transmission power of each CC in the secondary cell group does not exceed the guaranteed transmission power $P_{SeNB}$, the total sum of the transmission power of each CC in the master cell group exceeds the guaranteed transmission power $P_{MeNB}$, so that the user terminal allocates the requested power to the secondary cell group as transmission power, and allocates the rest of the power (the extra power that is left after the secondary cell group's transmission power is subtracted from the maximum possible transmission power $P_{CMAX}$) to the master cell group. The user terminal sees this remaining power as the maximum possible transmission power for the master cell group, and applies power scaling or dropping to the master cell group.

As for the rules of power scaling and/or dropping, the rules set forth in Rel. 10/11 can be applied. Rel. 10/11 sets forth the rules of power scaling and/or dropping for when simultaneous transmissions in a plurality of CCs take place during CA, for when the requested transmission power of all CCs exceeds the maximum possible transmission power $P_{CMAX}$ per user terminal, and so on. By using the above-noted remaining power (the extra power that is left after the master cell group's transmission power is subtracted from the maximum possible transmission power $P_{CMAX}$) as the maximum possible transmission power and using the transmission power that is requested in this cell group as the requested transmission power, it is possible to apply power scaling and/or dropping to this cell group based on the rules set forth in Rel. 10/11. These can be made possible with mechanisms that have been set forth heretofore, so that the user terminal can easily realize transmission power control and the rules of power scaling and/or dropping by re-cycling existing mechanisms, without introducing new mechanisms.

In non-dual connectivity (non-DC), the maximum transmission power of the PRACH is the user terminal's maximum transmission power $P_{CMAX,c}$ per CC. Also, there is a rule to allocate transmission power to the PRACH with the highest priority if the PRACH is going to be transmitted simultaneously with the PUCCH, the PUSCH or the SRS (Sounding Reference Signal) while carrier aggregation is employed. For example, when the PRACH and the PUCCH/PUSCH are going to be transmitted at the same time and the transmission power exceeds the maximum possible transmission power $P_{CMAX}$, power scaling is applied to the transmission power of the PUCCH/PUSCH until the actual transmission power assumes a value that does not exceed $P_{CMAX}$. Also, when the PRACH and the SRS are going to be transmitted at the same time and the transmission power exceeds the maximum possible transmission power $P_{CMAX}$, the user terminal drops the SRS so that the actual transmission power does not exceed $P_{CMAX}$.

Note that, in the event of carrier aggregation, if random access occurs in two or more different TAGs at the same time, the user terminal makes random access in either one of them. Consequently, cases cannot occur where two or more PRACHs are transmitted at the same time.

On the other hand, dual connectivity sets forth no rules as to how to allocate power to the PRACH. First, there is a problem as to what value the maximum transmission power of the PRACH should be configured to. Also, another problem has to do with how the priority rules should be configured when PRACHs are transmitted at the same time in two cell groups, or when a given cell group's PRACH and another cell group's PUCCH, PUSCH or SRS are transmitted at the same time.

Considering the above, the present inventors have studied the fact that guaranteed transmission power is configured for PUCCH/PUSCH transmissions in dual connectivity, and arrived at a structure to configure the maximum transmission power of the PRACH.

Considering that guaranteed transmission power $P_{MeNB}$ or $P_{SeNB}$ can be configured for the maximum transmission power for the PUCCH/PUSCH, the maximum transmission power of the PRACH may be configured in the following four patterns.

(1) The maximum transmission power for the PRACH is $P_{CMAX,c}$. That is, regardless of the value of the guaranteed transmission power $P_{MeNB}$ or $P_{SeNB}$, the PRACH assumes the same maximum transmission power value as when dual connectivity is not employed. In this case, there is a possibility that the PRACH of a given cell group and the PUCCH/PUSCH of another cell group are transmitted at the same time and become power-limited. At this time, transmission power has to be preferentially allocated to the PRACH regardless of the value of the guaranteed transmission power in the other group. By so doing, a PRACH coverage that is substantially equal to that of when carrier aggregation or a single carrier is used can be secured.

(2) The maximum transmission power of the PRACH is $\min\{P_{CMAX,c}, P_{MeNB\ (SeNB)}\}$. Here, $P_{MeNB\ (SeNB)}$ is the guaranteed power in the cell group where the PRACH is triggered. In this case, only the area where power is guaranteed for the PUCCH/PUSCH—that is, the area where dual connectivity is possible for certain—becomes the PRACH coverage. However, when $P_{MeNB}+P_{SeNB}<P_{CMAX}$ holds, it is not possible to secure a sufficient coverage.

(3) The maximum transmission power of the PRACH is $\min\{P_{CMAX,c}, P_{CMAX}-P_{SeNB\ (MeNB)}\}$. Here, $P_{CMAX}-P_{SeNB\ (MeNB)}$ represents the power that is left after the guaranteed power in another cell group where the PRACH is not triggered is subtracted from the maximum transmission power with which the user terminal can carry out transmission. In this case, it is possible to guarantee the other cell group's guaranteed transmission power, and, furthermore, secure a comparatively wide coverage. Also, when $P_{MeNB}+P_{SeNB}<P_{CMAX}$ holds, a wide coverage can be secured compared to above (2).

(4) The maximum transmission power of the PRACH is configured separately in a higher layer. In this case, the maximum transmission power of the PRACH is equal to or lower than $P_{CMAX,c}$. The higher layer parameter to configure the maximum transmission power of the PRACH may be configured to the same value as the guaranteed transmission power $P_{MeNB}$ or $P_{SeNB}$ of the PUCCH/PUSCH, or may be configured to a different value. The transmission power that is required for proper receipt in the radio base station varies between the PUCCH/PUSCH and the PRACH. Consequently, by configuring the maximum transmission power separately with a higher layer parameter, it is possible to maintain above (1) to (3), and, furthermore, achieve flexibility to configure a different value for the PRACH from that of the PUCCH/PUSCH.

Figure 5A:
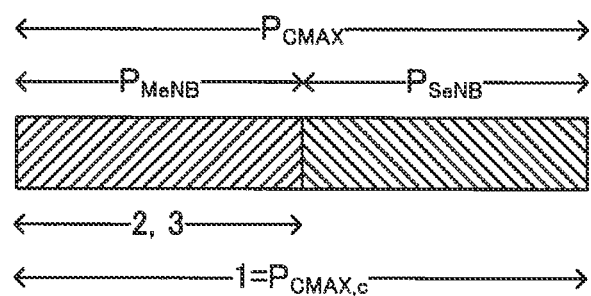
FIG. 5 provide diagrams to explain the configuration of the maximum transmission power of the PRACH in a master cell group.
Figure 5B:
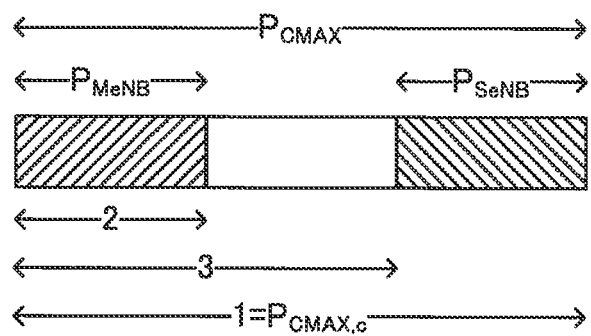

FIG. 5 provide diagrams to explain the configuration of the maximum transmission power for the PRACH in the master cell group. FIG. 5A shows a case where $P_{MeNB}+P_{SeNB}=P_{CMAX}$ holds, and FIG. 5B shows a case where $P_{MeNB}+P_{SeNB}<P_{CMAX}$ holds.

As shown in FIG. 5A, when $P_{MeNB}+P_{SeNB}=P_{CMAX}$ holds, the maximum transmission power for the PRACH in above (2) and (3) is $P_{MeNB}$. The maximum transmission power for the PRACH in above (1) is $P_{CMAX,c}$ ($=P_{CMAX}$).

As shown in FIG. 5B, when $P_{MeNB}+P_{SeNB}<P_{CMAX}$ holds, the maximum transmission power for the PRACH in above (2) is $P_{MeNB}$. The maximum transmission power for the PRACH in above (3) is $P_{CMAX}-P_{SeNB}$. The maximum transmission power for the PRACH in above (1) is $P_{CMAX}$, $(=P_{CMAX})$.

Note that the maximum transmission power of the PRACH may be the same or different between the PRACH of the master cell group and the PRACH of the secondary cell group. For example, the PRACH of the master cell group may assume the value of above (1) for its maximum transmission power, and the PRACH of the secondary cell group may assume the value of one of above (2) to (4) as its maximum transmission power.

When a random access failure repeats a predetermined number of times in the PCell of the master cell group, the user terminal detects a radio link failure and moves on to the re-connection procedure. The re-connection procedure is a re-do of the initial connection and others, and, if this occurs frequently, the user throughput deteriorates significantly. Consequently, by making the maximum transmission power of the master cell group have the value of above (1), it is possible to reduce the possibility that the re-connection procedure occurs. On the other hand, when a random access failure occurs in the secondary cell group and the user terminal detects the radio link failure, the user terminal reports the occurrence of the radio link failure to the network through the master cell group, but nevertheless does not perform the re-connection procedure. Consequently, by making the PRACH of the secondary cell group have the value of one of above (2) to (4), it is possible to keep the guaranteed transmission power configured for the PUCCH/PUSCH of the master cell group.

In the case of above (1), the coverage of the PRACH is up to the area where the quality of the PUCCH or the PUSCH cannot be guaranteed. Consequently, although random access succeeds, an area where dual connectivity cannot be implemented with predetermined quality is produced.

In the case of above (2), (3) or (4), the coverage of the PRACH becomes smaller, and the dual connectivity area becomes smaller than that of carrier aggregation.

If, when the PRACH is transmitted, another cell group's guaranteed transmission power is guaranteed as with the PUCCH/PUSCH, the coverage of the PRACH becomes smaller, and the possibility of a radio link failure increases. On the other hand, if the maximum transmission power of the PRACH is made $P_{CMAX,c}$, although the possibility of a radio link failure can be reduced with random access, Referring to the random access procedure shown in FIG. 1, if the PRACH is not received properly on the network side, the user terminal fails to receive message 2. When the user terminal is unable to receive message 2 within a predetermined period of time, the user terminal applies power-ramping and retransmits the PRACH.

Figure 6:
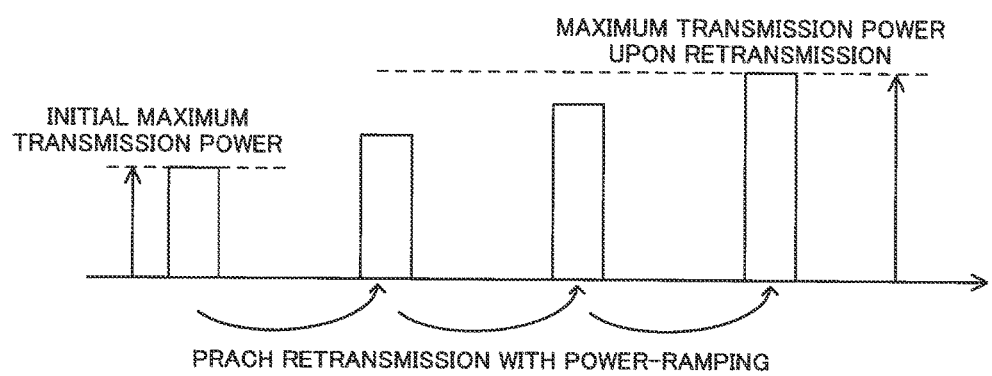
FIG. 6 is a diagram to explain the use of power-ramping.

As shown in FIG. 6, upon the initial PRACH transmission, one of above (2) to (4)—that is, one of min{$P_{CMAX,c}$, $P_{MeNB\ (SeNB)}$}, min{$P_{CMAX,c}$, $P_{CMAX}-P_{MeNB\ (SeNB)}$} and RRC parameter ($\leq P_{CMAX,c}$)—is used as the maximum transmission power, and, when the PRACH is retransmitted, power-ramping is applied by making the maximum transmission power $P_{CMAX,c}$.

Figure 7:
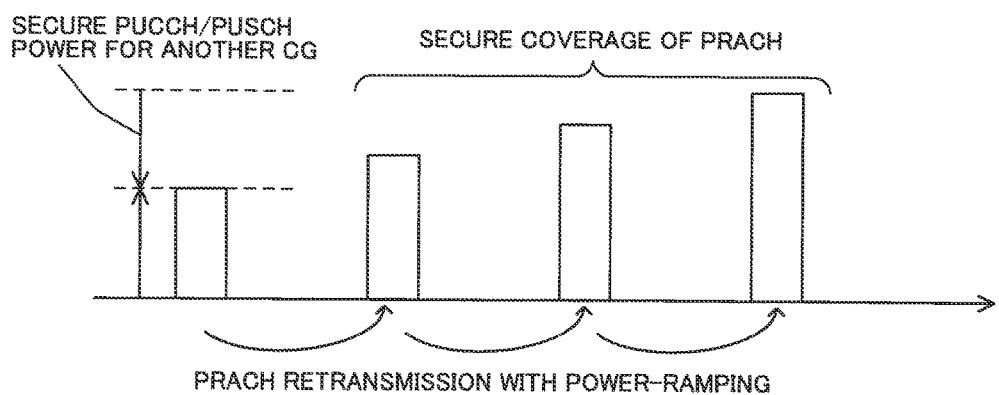
FIG. 7 is a diagram to explain the use of power-ramping.

According to this method, as shown in FIG. 7, the maximum power, with which the guaranteed transmission power that is configured in another cell group in order to protect the PUCCH/PUSCH can be secured, is made the maximum transmission power of the initial PRACH, so that it is possible to guarantee the other cell group's PUCCH/PUSCH power, and, furthermore, allocate the rest of the power to the PRACH. Also, by making the maximum transmission power upon PRACH retransmission $P_{CMAX,c}$, it is possible to achieve an equivalent PRACH coverage to that in non-dual connectivity.

Assuming that power is more preferentially allocated to the PRACH, in order to secure the coverage of the PRACH by using power-ramping, it is necessary to apply power scaling or dropping to the transmission of other cell groups. Consequently, when PRACH retransmission takes place, if there is a PUCCH/PUSCH to be transmitted at the same time in another cell group, power is preferentially allocated to the retransmitting PRACH. Note that the assumption holds that, when PRACHs are transmitted from the master cell group and the secondary cell group at the same time, the master cell group's PRACH is prioritized.

In asynchronous dual connectivity, in the case where another cell group's uplink is transmitted prior to the PRACH (see FIG. 8), the power that is necessary to transmit the PRACH needs to be calculated at the time the other cell group's uplink transmission starts, in order to apply power scaling or dropping to the uplink of the other cell group.

Figure 8:
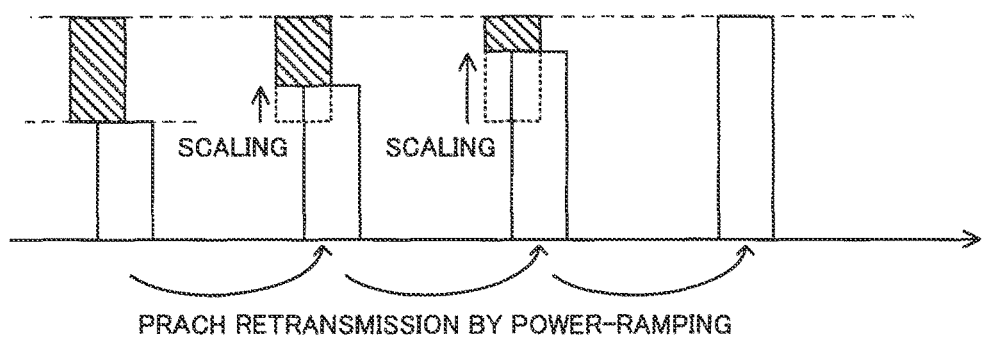
FIG. 8 is a diagram to explain the use of power-ramping.

Usually, to perform such a process when transmitting the PUCCH/PUSCH or upon the initial PRACH transmission, a user terminal has to calculate power in a shorter processing time than in conventional LTE. For example, in the case where, as shown in FIG. 8, another cell group's uplink is transmitted prior to the PRACH, the transmission power of the PRACH, which is going to be transmitted later, has to be calculated before the other cell group's uplink is transmitted. Whether or not there is a PRACH to be transmitted later and how strong its transmission power is may not be learned at the timing the other cell group's uplink transmission starts. This, consequently, means that the user terminal has to implement a novel power control processing algorithm, which multiplies the increase of the circuit cost. However, according to the power-ramping of the above method, how much power is needed can be determined from earlier transmission power and the value of power-ramping, so that an algorithm to enable shortening of the processing time is not necessary.

According to the power-ramping of the above-described method, the user terminal can learn in advance the transmission power that is needed upon next retransmission, based on the power upon PRACH transmission at a given point in time. In asynchronous dual connectivity, even when the transmission power of a PRACH and another cell group's uplink transmission become power-limited, the user terminal does not have to calculate power in a shorter processing time than in conventional LTE, and still power scaling can be applied adequately.

The power-ramping according to the above-described method may target only PRACHs within the master cell group. In this case, the maximum transmission power of PRACHs in the secondary cell group is one of above (2) to (4), both in the initial transmission and in retransmissions. In this case, the PUCCH/PUSCH transmission power of the master cell group, which is important to maintain connectivity, is secured, so that it is possible to prevent the deterioration of communication quality.

Figure 9:
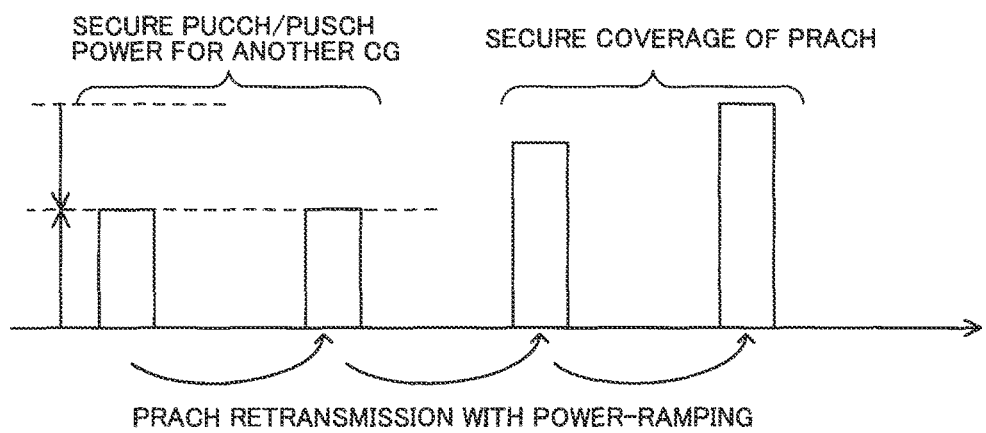
FIG. 9 is a diagram to explain the use of power-ramping.

The maximum transmission power of a PRACH may be changed after it is retransmitted a predetermined number of times. For example, the maximum transmission power of a PRACH may be changed from the X-th retransmission (assume that X=2, 3 or configurable). In this case, as shown in FIG. 9, a tradeoff between securing PUCCH/PUSCH transmission power for another cell group and shortening the delay time before random access succeeds can be achieved. For example, of the value of X is made bigger, the delay time before random access succeeds increases, but PUCCH/PUSCH transmission power can be secured. On the other hand, if the value of X is made smaller, the possibility that PUCCH/PUSCH transmission power cannot be secured increases, but the delay time before random access succeeds becomes shorter. Note that the value of X may be provided in advance, or may be a value that is reported to the user terminal via higher layer signaling and so on.

According to the above-described method, it is possible to allocate transmission power to PRACHs to transmit to the master base station, without applying new limitations, so that the possibility of radio link failures can be reduced. Also, the opportunities to make the power of PRACHs free of new limitations are limited to after power-ramping is applied, so that the user terminal can calculate the power that is necessary for the PRACHs that are transmitted without new limitations, in advance. By this means, it becomes possible to share power between cell groups without damaging the waveforms of other uplink channels transmitted in other cell groups.

(Structure of Radio Communication System)

Now, the structure of the radio communication system according to the present embodiment will be described below. In this radio communication system, a radio communication method to use the above-described power control is employed.

Figure 10:
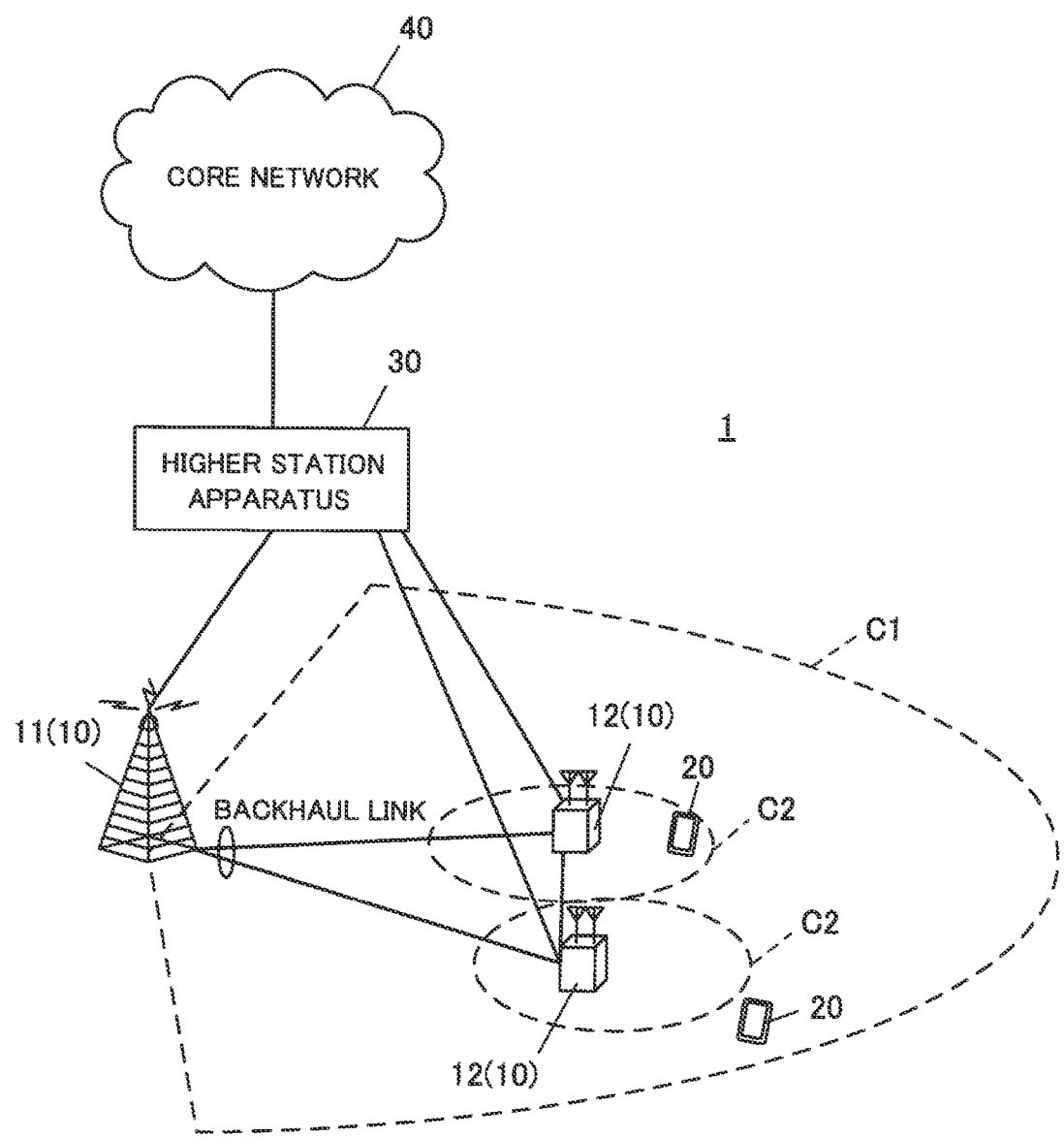
FIG. 10 is a diagram to show an example of a schematic structure of a radio communication system according to the present embodiment.

FIG. 10 is a schematic structure diagram to show an example of the radio communication system according to the present embodiment. As shown in FIG. 10, a radio communication system 1 is comprised of a plurality of radio base stations 10 (11 and 12), and a plurality of user terminals 20 that are present within cells formed by each radio base station 10, and that are configured to be capable of communicating with each radio base station 10. The radio base stations 10 are each connected with a higher station apparatus 30, and are connected to a core network 40 via the higher station apparatus 30.

In FIG. 10, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 10.

In the macro cell C1 and the small cells C2, the same frequency band may be used, or different frequency bands may be used. Also, the radio base stations 11 and 12 are connected with each other via an inter-base station interface (for example, optical fiber, the X2 interface, etc.).

Between the radio base station 11 and the radio base stations 12, between the radio base station 11 and other radio base stations 11, or between the radio base stations 12 and other radio base stations 12, dual connectivity mode (DC) or carrier aggregation (CA) is employed.

The user terminals 20 are terminals to support various communication schemes such as LTE, LTE-A and so on, and may include both mobile communication terminals and stationary communication terminals. The user terminals 20 can communicate with other user terminals 20 via the radio base stations 10.

Note that the higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH) and so on are used as downlink channels. User data, higher layer control information and predetermined SIBs (System Information Blocks) are communicated in the PDSCH. Downlink control information (DCI) is communicated by the PDCCH and the EPDCCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink channels. User data and higher layer control information are communicated by the PUSCH.

Figure 11:
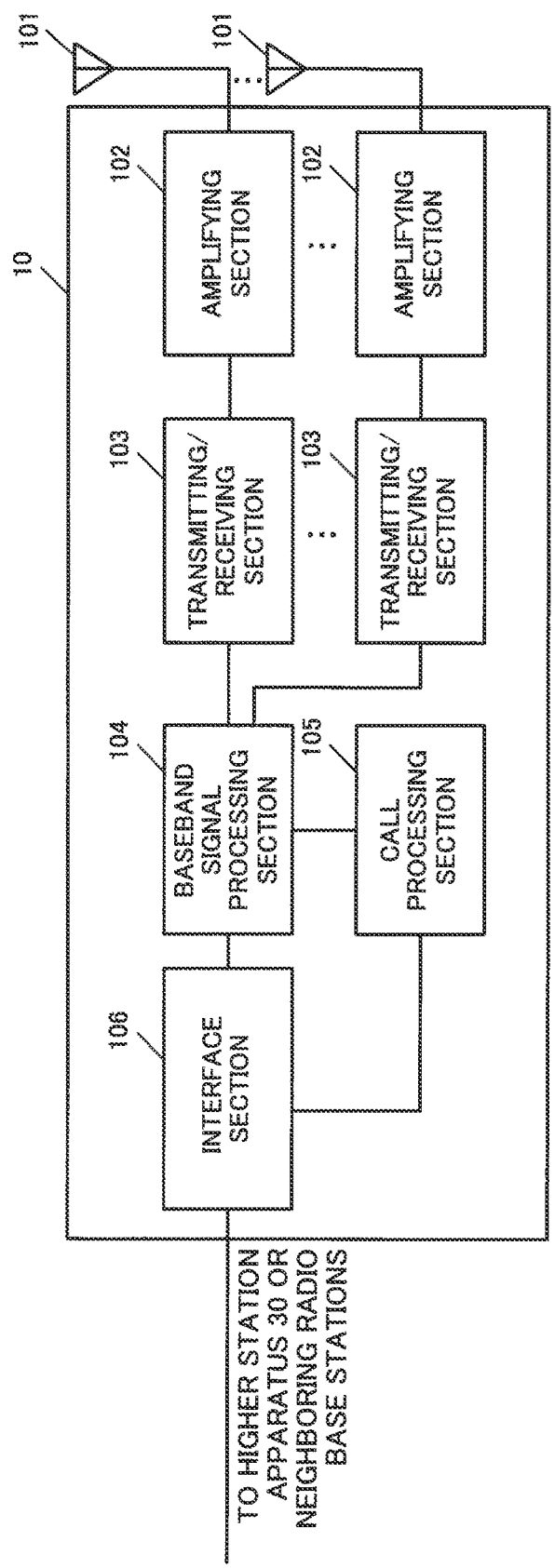
FIG. 11 is a diagram to show an example of an overall structure of a radio base station according to the present embodiment.

FIG. 11 is a diagram to show an overall structure of a radio base station 10 according to the present embodiment. As shown in FIG. 11, the radio base station 10 has a plurality of transmitting/receiving antennas 101 for MIMO communication, amplifying sections 102, transmitting/receiving sections (transmitting section and receiving section) 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

The transmitting/receiving sections 103 receive the PRACH transmitted from the user terminal.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 12:
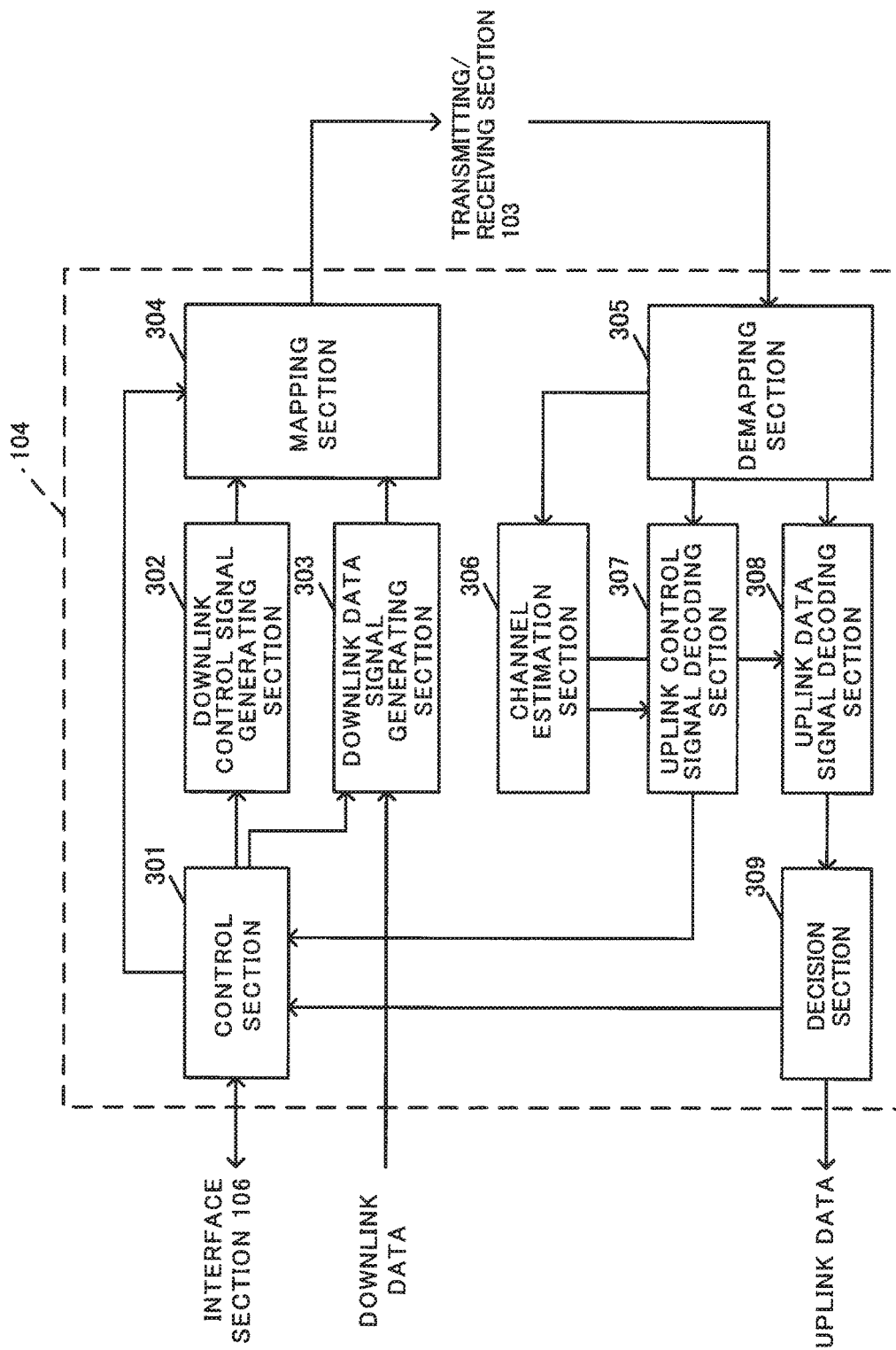
FIG. 12 is a diagram to show an example of a functional structure of a radio base station according to the present embodiment.

FIG. 12 is a diagram to show a principle functional structure of the baseband signal processing section 104 provided in the radio base station 10 according to the present embodiment. As shown in FIG. 12, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in one or both of the PDCCH and the enhanced PDCCH (EPDCCH), downlink reference signals and so on. Also, the control section 301 controls the scheduling of RA preambles communicated in the PRACH, uplink data that is communicated in the PUSCH, uplink control information that is communicated in the PUCCH or the PUSCH, and uplink reference signals (allocation control). Information about the allocation control of uplink signals (uplink control signals, uplink user data, etc.) is reported to the user terminals 20 by using a downlink control signal (DCI).

The control section 301 controls the allocation of radio resources to downlink signals and uplink signals based on command information from the higher station apparatus 30, feedback information from each user terminal 20, and so on. That is, the control section 301 functions as a scheduler. For the control section 301, a controller, a control circuit or a control device that can be described based on common understanding of the technical field to which the present invention pertains can be used.

The downlink control signal generating section 302 generates downlink control signals (which may be both PDCCH signals and EPDCCH signals, or may be one of these) that are determined to be allocated by the control section 301. To be more specific, the downlink control signal generating section 302 generates downlink assignments, which report downlink signal allocation information, and uplink grants, which report uplink signal allocation information, based on commands from the control section 301. For the downlink control signal generating section 302, a signal generator or a signal generating circuit that can be described based on common understanding of the technical field to which the present invention pertains can be used.

The downlink data signal generating section 303 generates downlink data signals (PDSCH signals) that are determined to be allocated to resources by the control section 301. The data signals that are generated in the data signal generating section 303 are subjected to a coding process and a modulation process, based on coding rates and modulation schemes that are determined based on CSI from each user terminal 20 and so on.

The mapping section 304 controls the allocation of the downlink control signals generated in the downlink control signal generating section 302 and the downlink data signals generated in the downlink data signal generating section 303 to radio resources based on commands from the control section 301. For the mapping section 304, a mapping circuit or a mapper that can be described based on common understanding of the technical field to which the present invention pertains can be used.

The demapping section 305 demaps the uplink signals transmitted from the user terminals 20 and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals and/or the like) transmitted from the user terminals in the uplink control channels (PRACH, PUCCH, etc.), and outputs the results to the control section 301. The uplink data signal decoding section 308 decodes the uplink data signals transmitted from the user terminals through the uplink shared channel (PUSCH), and outputs the results to the decision section 309. The decision section 309 makes retransmission control decisions (A/N decisions) based on the decoding results in the uplink data signal decoding section 308, and outputs the results to the control section 301.

Figure 13:
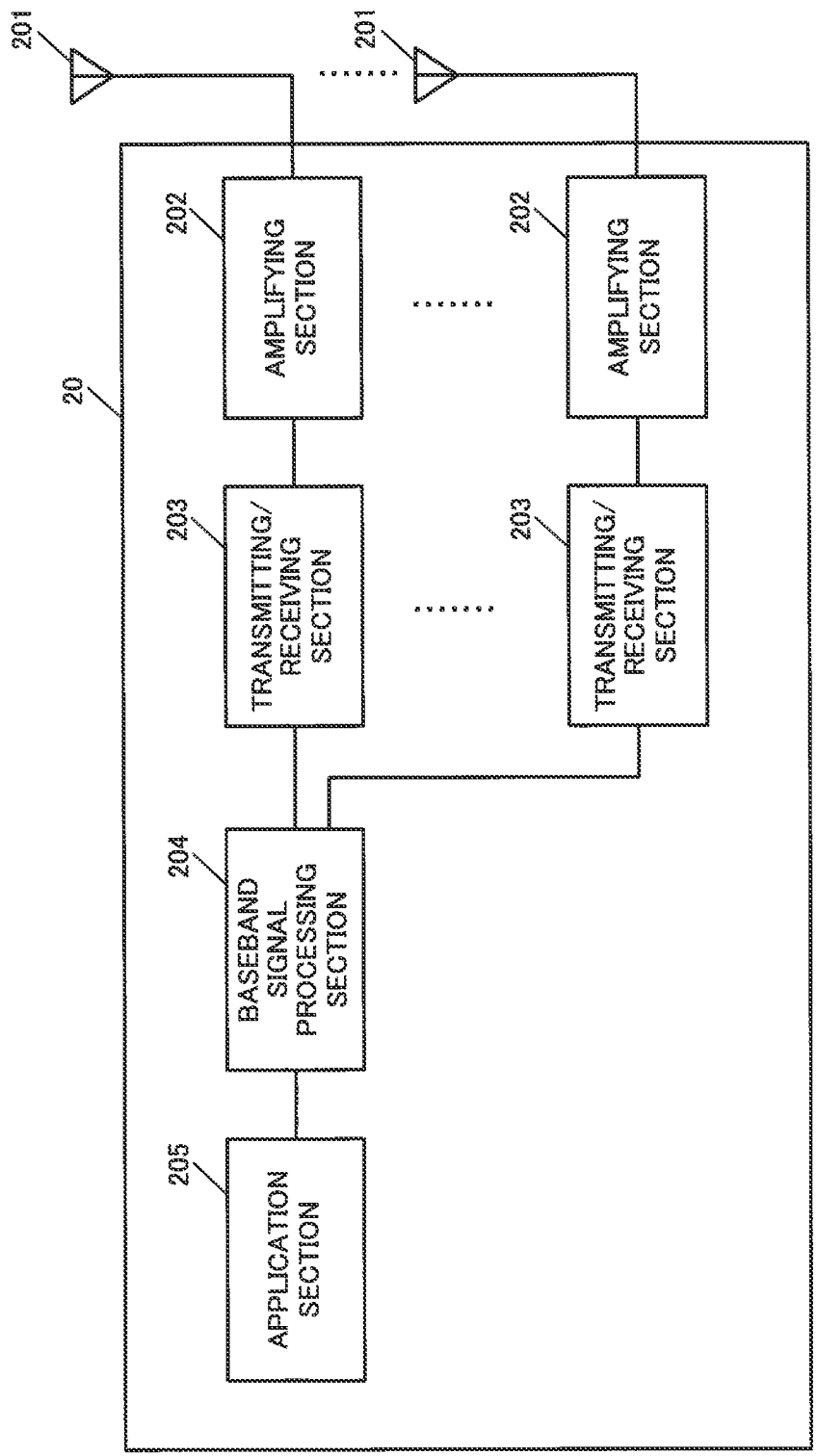
FIG. 13 is a diagram to show an example of an overall structure of a user terminal according to the present embodiment.

FIG. 13 is a diagram to show an overall structure of a user terminal according to the present embodiment. As shown in FIG. 13, the user terminal 20 has a plurality of transmitting/receiving antennas 201 for MIMO communication, amplifying sections 202, transmitting/receiving sections (transmitting section and receiving section) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205. For the transmitting/receiving sections 203, transmitters/receivers, transmitting/receiving circuits or transmitting/receiving devices that can be described based on common understanding of the technical field to which the present invention pertains can be used.

Meanwhile, uplink user data is input from the application section 205 to the baseband signal processing section 204. In the baseband signal processing section 204, a retransmission control (HARQ: Hybrid ARQ) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

The transmitting/receiving sections 203 transmit the physical random access channel (PRACH) in the random access procedure.

Figure 14:
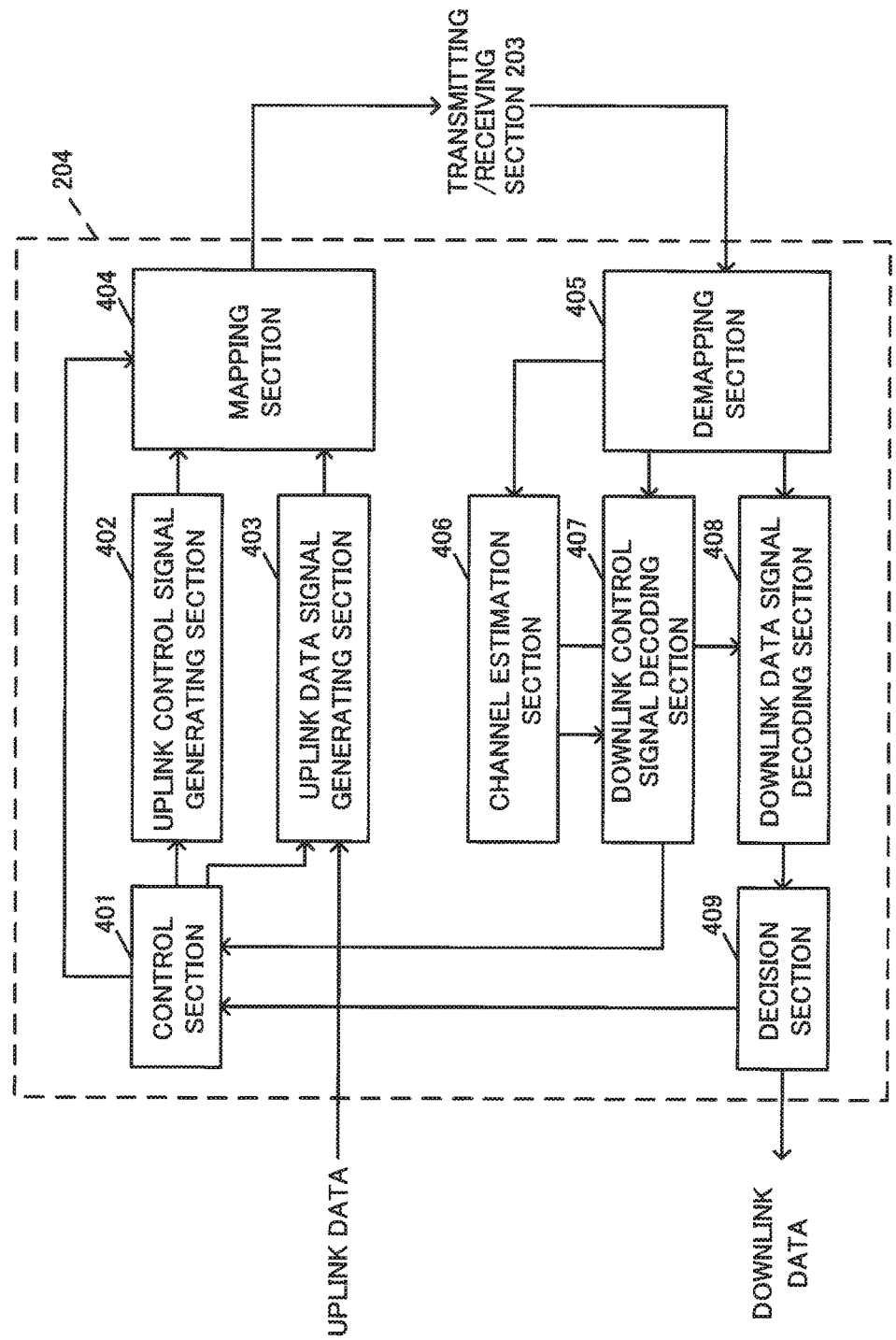
FIG. 14 is a diagram to show an example of a functional structure of a user terminal according to the present embodiment.

FIG. 14 is a diagram to show a principle functional structure of the baseband signal processing section 204 provided in the user terminal 20. As shown in FIG. 14, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals, etc.), uplink data signals and so on, based on the downlink control signals (PDCCH signals) transmitted from the radio base stations 10, retransmission control decisions in response to the PDSCH signals received, and so on. The downlink control signals received from the radio base stations are output from the downlink control signal decoding section 408, and the retransmission control decisions are output from the decision section 409. For the control section 401, a controller, a control circuit or a control device that can be described based on common understanding of the technical field to which the present invention pertains can be used.

The control section 401 functions as a control section to control the power for transmitting the PRACH. The control section 401 controls the maximum transmission power upon the initial transmission of a PRACH by taking into consideration the guaranteed transmission power value of the cell group ($P_{MeNB\ (SeNB)}$) or a value that is configured from the radio base stations, and controls the maximum transmission power upon PRACH retransmissions to be the user terminal's maximum possible transmission power value ($P_{CMAX,c}$).

The uplink control signal generating section 402 generates uplink control signals (feedback signals such as delivery acknowledgement signals, channel state information (CSI) and so on) based on commands from the control section 401. The uplink data signal generating section 403 generates uplink data signals based on commands from the control section 401. Note that, when an uplink grant is contained in a downlink control signal reported from the radio base station, the control section 401 commands the uplink data signal 403 to generate an uplink data signal. For the uplink control signal generating section 402, a signal generator or a signal generating circuit that can be described based on common understanding of the technical field to which the present invention pertains can be used.

The mapping section 404 controls the allocation of the uplink control signals (delivery acknowledgment signals and so on) and the uplink data signals to radio resources (PUCCH, PUSCH, etc.) based on commands from the control section 401.

The demapping section 405 demaps the downlink signals transmitted from the radio base station 10 and separates the downlink signals. The channel estimation section 406 estimates channel states from the reference signals included in the received signals separated in the demapping section 405, and outputs the estimated channel states to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401. Also, when information about the cell to feed back delivery acknowledgement signals to or information as to whether or not to apply RF tuning is included in a downlink control signal, these pieces of information are also output to the control section 401.

The downlink data signal decoding section 408 decodes the downlink data signals transmitted in the downlink shared channel (PDSCH), and outputs the results to the decision section 409. The decision section 409 makes retransmission control decisions (A/N decisions) based on the decoding results in the downlink data signal decoding section 408, and outputs the results to the control section 401.

Note that the present invention is by no means limited to the above embodiment and can be carried out with various changes. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2014-143221, filed on Jul. 11, 2014, including the specification, drawings and abstract, is incorporated herein by reference in its entirety.

The invention claimed is:

1. A user terminal that communicates by using a first cell group (CG) and a second CG, comprising:
a processor that controls UL transmission power for the first CG and the second CG; and
a transmitter that transmits at least a physical random access channel (PRACH),
wherein, when the transmitter retransmits the PRACH in a primary cell of the first CG and the processor is able to prepare transmission power required for retransmission of the PRACH in the primary cell of the first CG a predetermined period before the retransmission of the PRACH in the first CG, the processor applies control so that power is preferentially allocated to the retransmission of the PRACH over transmission in the second CG.

2. The user terminal according to claim 1, wherein, when total transmission power of the retransmission of the PRACH in the primary cell of the first CG and the transmission in the second CG exceeds maximum possible transmission power, the processor applies power scaling or dropping to the transmission in the second CG.

3. The user terminal according to claim 2, wherein the transmission in the second CG is PUCCH/PUSCH transmission or PRACH transmission.

4. The user terminal according to claim 1, wherein the transmission in the second CG is PUCCH/PUSCH transmission or PRACH transmission.

5. The user terminal according to claim 1, wherein the processor calculates the transmission power required for the retransmission of the PRACH, at least when the transmission in the second CG starts, based on power upon PRACH transmission at a given point.

6. The user terminal according to claim 1, wherein the first CG is a master cell group and the second CG is a secondary cell group.

7. A radio communication method for a user terminal that communicates by using a first cell group (CG) and a second CG, the radio communication method comprising:
controlling UL transmission power for the first CG and the second CG; and transmitting at least a physical random access channel (PRACH), wherein, when the user terminal retransmits the PRACH in a primary cell of the first CG and is able to prepare transmission power required for retransmission of the PRACH in the primary cell of the first CG a predetermined period before the retransmission of the PRACH in the first CG, the user terminal applies control so that power is preferentially allocated to the retransmission of the PRACH over transmission in the second CG.

8. The radio communication method according to claim 7, wherein, when total transmission power of the retransmission of the PRACH in the primary cell of the first CG and the transmission in the second CG exceeds maximum possible transmission power, the user terminal applies power scaling or dropping to the transmission in the second CG.

9. A radio communication system comprising a user terminal that communicates by using a first cell group (CG) and a second CG, a first radio base station that communicates with the user terminal by using the first CG, and a second radio base station that communicates with the user terminal by using the second CG, wherein:

the user terminal comprises:

a processor that controls UL transmission power for the first CG and the second CG; and a transmitter that transmits at least a physical random access channel (PRACH)

wherein, when the transmitter retransmits the PRACH in a primary cell of the first CG and the processor is able to prepare transmission power required for retransmission of the PRACH in the primary cell of the first CG a predetermined period before the retransmission of the PRACH in the first CG, the processor applies control so that power is preferentially allocated to the retransmission of the PRACH over transmission in the second CG.

10. The radio communication system according to claim 9, wherein, when total transmission power of the retransmission of the PRACH in the primary cell of the first CG and the transmission in the second CG exceeds maximum possible transmission power, the processor applies power scaling or dropping to the transmission in the second CG.

11. The radio communication system according to claim 9, wherein the processor calculates the transmission power required for the retransmission of the PRACH, at least when the transmission in the second CG starts, based on power upon PRACH transmission at a given point.

* * * * *